United States Patent [19]

Niemuth et al.

[11] 4,410,254
[45] Oct. 18, 1983

[54] PIN REGISTRATION BACK FOR FILM STRIP CAMERA

[75] Inventors: Howard A. Niemuth; Herbert D. Bredehorn, both of Chicago, Ill.

[73] Assignee: Uniquip Manufacturing, Inc., Chicago, Ill.

[21] Appl. No.: 341,833

[22] Filed: Jan. 22, 1982

[51] Int. Cl.³ .............................................. G03B 17/00
[52] U.S. Cl. ..................................... 354/203; 354/217
[58] Field of Search .............. 354/203, 215, 217, 218, 354/289, 213; 355/72; 352/221, 227

[56] References Cited

U.S. PATENT DOCUMENTS

| | | | |
|---|---|---|---|
| 1,213,687 | 1/1917 | Pelham | 354/213 |
| 4,034,393 | 7/1977 | Goldmacher | 354/217 |
| 4,139,294 | 2/1979 | Aneshansley | 354/217 |
| 4,241,987 | 12/1980 | Goldberg | 354/203 |

FOREIGN PATENT DOCUMENTS 89168 10/1958 Netherlands .................. 354/203

*Primary Examiner*—A. A. Mathews

[57] ABSTRACT

A way of "customizing" a standard single lens reflex camera that uses perforated film to include four film registration pins for precisely aligning the film frame with respect to the film aperture. These four pins control the position of the film and eliminate skewing. The pins engage the perforations in the film except during film transport. Also included is a non-contact frame counter that utilizes the perforations to indicate frame count and film movement.

11 Claims, 7 Drawing Figures

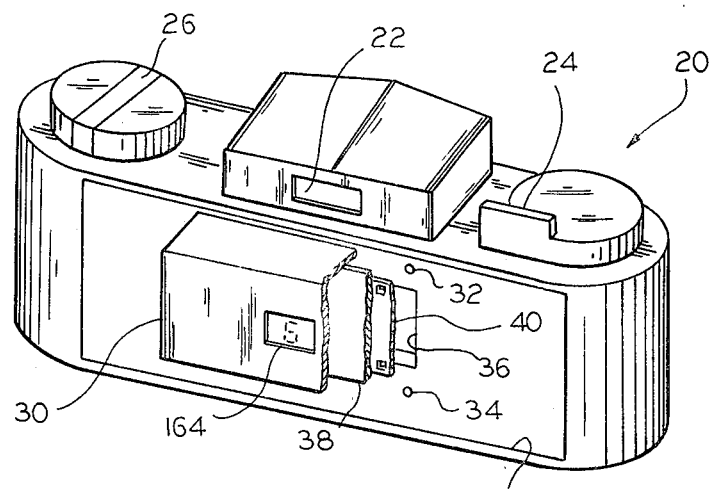
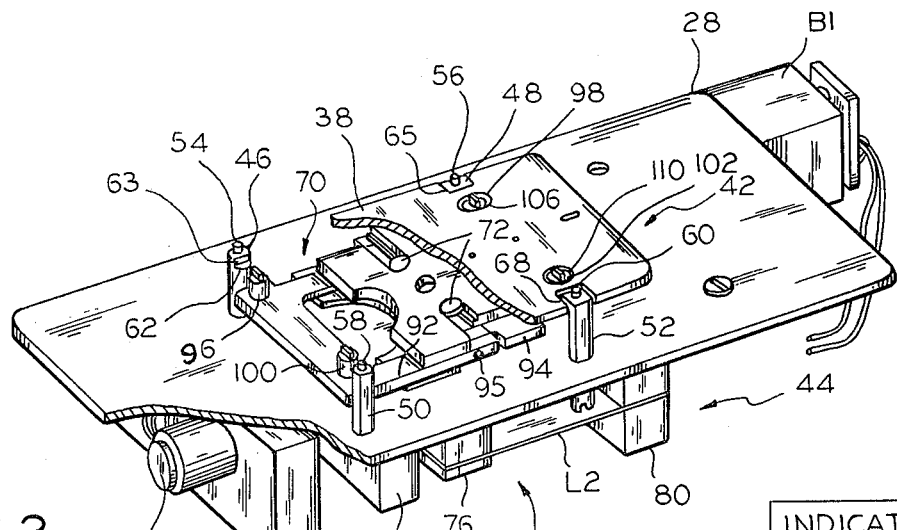
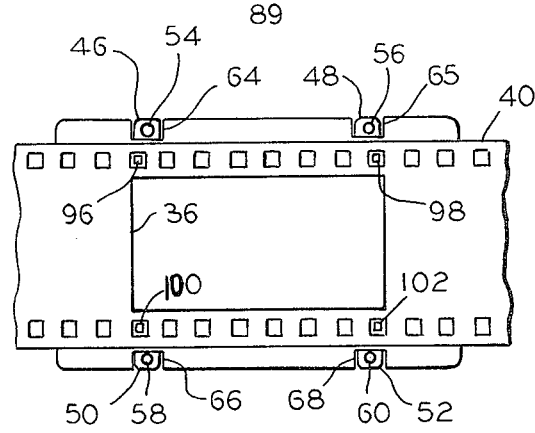
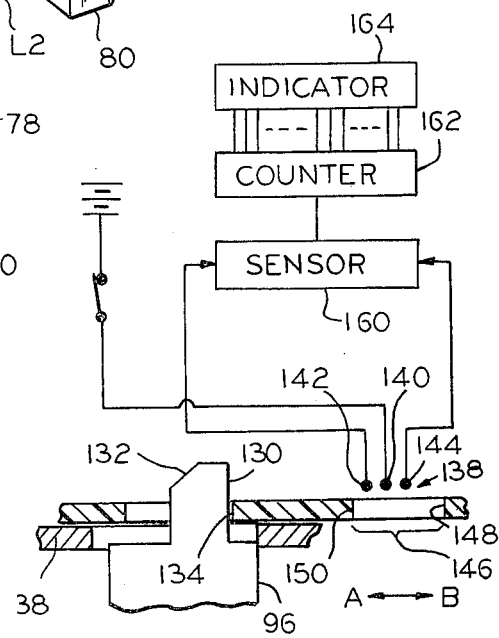
FIG.1
FIG.2
FIG.7
FIG.6

PIN REGISTRATION BACK FOR FILM STRIP CAMERA

This invention relates to precisely aligning strip film in cameras and more particularly to new and improved means for and methods of establishing and maintaining precision in the alignment of such film.

In the following specification, it will be convenient to speak in terms of "customizing" a camera with "replacement" backs because those terms distinguish over conventional designs of the backs normally built for and used on cameras. These terms do not imply that either the "customization" or the "replacement" backs are applied to any particular camera at any particular time. For example, either during the manufacture of any existing camera type, or in the design of a new camera type, certain (or all) camera bodies may be "customized" and the "replacement" backs may be used. Or, at the other extreme, a camera, already installed and operating (say, an automation camera) may be retrofit to "customize" the camera to include the inventive replacement back. Obviously, there could also be many other times and places where the invention could be used.

An example of a film strip is the well known 35 mm or 70 mm (in any length and format) film having rows of sprocket holes extending along the opposing sides of the film, or the like. These sprocket holes are precisely formed in the film so that they provide reliable index points for positioning and repositioning film. Exactly eight consecutive sprocket holes (in one example) measure a length of film which exactly coincides with one so-called double frame. Of course, other sized frames can be measured by counting a different member of sprocket holes.

A camera body has an aperture forming a format area through which the camera lens projects an image on to the film strip. Of course, the format aperture is formed in hard metal (or the equivalent) so that it cannot move. Thus, the film strip may be reliably positioned and repositioned on rewind if the sprocket holes are precisely located relative to the aperture forming the format area.

The reasons why the film strip should be positioned with this precision are irrelevent. However, to better understand the problems which the invention solves, it may be well to here mention a few such reasons. For example, an intentional multiple exposure may require the film to be held in an exact position for a very long period of time so that a later print or projected image will be sharp. To illustrate, a camera may be set up in early morning and a picture of the sun over a backlighted building may be taken through a sun filter on a telescopic lens. The lens may then be changed to a wide angle lens and late in the afternoon a second picture may be taken of the same building, thereby giving the building a front lighting with long shadows. Thus, the film must be held in an exact and unmoving position almost all day long. The printed picture is an oversize sun hanging low over a building with unusual lighting effects upon the building.

Another example of precise film registration is found in animation and panoramic pictures where a plurality of images from different pictures are either superimposed or juxtaposed during printing or projection. In some camera work, an image is built up throughout a sequence of frames by successively adding transparent cells, over lays, or the like, to a layout as each image is photographed. Then, the film is rewound and other images are taken in multiple exposures on the same frame. As the individual pictures are taken, it is important for the film to be very precisely located, relatively to adjacent sprocket holes in order to provide indexing and to eliminate alignment problems when the images are later projected or printed.

Heretofore, cameras have sometimes included one or two registrations pins which established and maintained film alignment (for example, see U.S. Pat. Nos. 1,213,687; 4,034,393; 4,139,294). However, these arrangements have not prevented some misaligning side effects, such as a slight skewing or rotation of the film strip, for example. The misalignment becomes more severe if the film must be wound and rewound between multiple exposures of the same frame.

Accordingly, an object of the invention is to provide new and improved means for and methods of reliably aligning a film strip relative to a format area. Here, an object is to preclude any skewing or rotation of the film. In particular, an object is to precisely hold film at approximately each corner of a format area.

Another object is to enable film to be exposed, wound, rewound and returned to the same format area for later multiple exposures, with perfect image alignment in each multiple exposure.

Still another object is to provide a powered film position locator so that the film may be indexed and held in a fixed position responsive to a push of a button. Here an object is to provide an automation which functions well with a power drive film advance.

Yet another object is to accomplish these and other objects with a relatively low cost adaptor which may be placed on any of many different types of cameras, either new cameras (during manufacture) or used cameras (by way of retrofit). Here, an object is to enable film exposed in different cameras to be located precisely enough, relative to the format area, so that they may be indexed together during a later printout or projection.

In keeping with an aspect of the invention, these and other objects are accomplished by means of a "replacement" camera back which may be directly substituted for a more conventional camera back. Mounted on the replacement back is a power driven unit for simultaneously raising or lowering four film registering pins to locate and secure sprocket holes near each of the four corners of a format area. There is an action which spreads the leading and trailing pins in order to hold the film taut. Also mounted on the replacement back are four back position indexing pins for precisely locating the power driven unit relative to the camera body.

Thus, almost any camera may be "customized" by replacing the "original" back and by drilling four back position indexing holes in the camera body at precisely located points adjacent the format area. The back position indexing pins are fitted into these indexing holes and then the replacement back is attached to the camera. As the back is opened or closed the indexing pins are always positioned in the back position indexing holes in the camera body to insure an accuracy of the back position despite any tendency for that position to change slightly as the back is opened and closed. This way, the film registration pins are always in the same identical position relative to the format aperture. Since the back position indexing holes may be drilled within an extremely precise location tolerance, many different cameras may be customized, with an assurance that they will all index the film in the same manner.

The invention is shown in the attached drawings, wherein:

FIG. 1 is a perspective view of a camera having the "replacement" back, partially cut away to show back position indexing holes, film, and a film pressure plate;

FIG. 2 is a perspective view of the replacement back with parts partially broken away to show the power drive motor, the back position indexing pins and the film registering pins together with associated parts;

FIG. 6, shows a fragment (taken from FIGS. 4, 5) of the top of a film registering pin; and FIG. 7 shows a film strip with the film registering pins holding it tautly in a precise position, relative to the format area.

Figure 3:
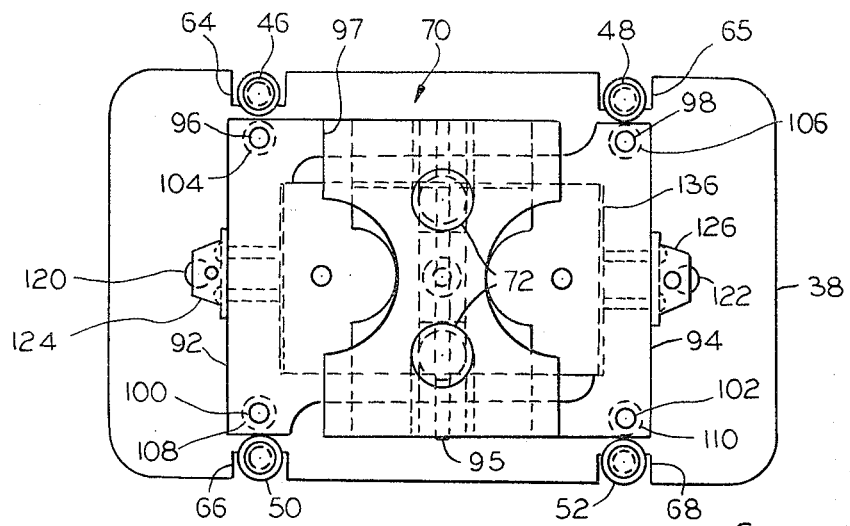
FIG. 3 is a plan view of an inventive table which supports film registering pins.
Figure 4:
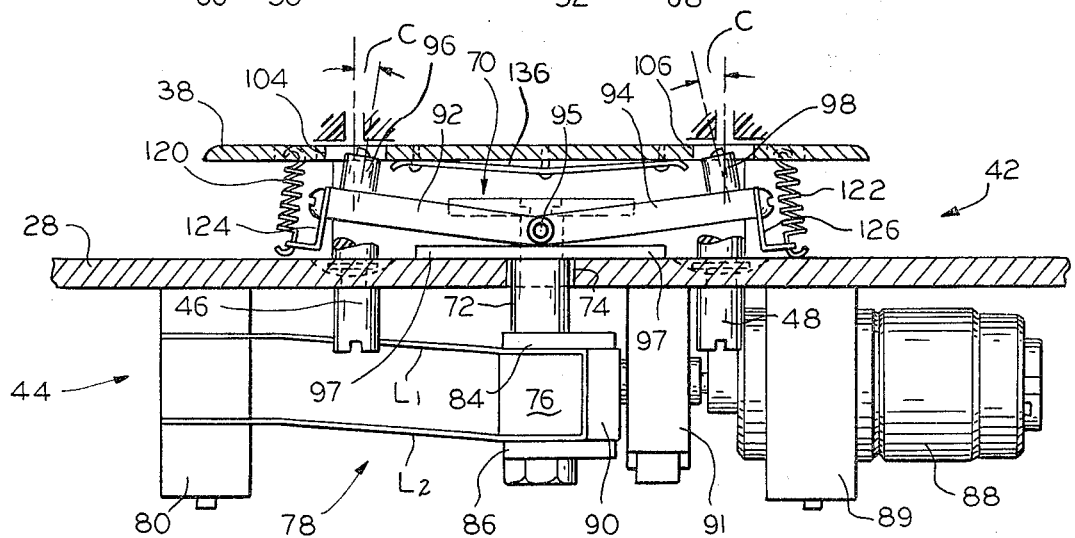
FIG. 4 shows the inventive replacement back in side elevation, with the film registering pins in a film disengaged position (also called the "lower" position) so that film may advance.

FIG. 1 generically shows any suitable camera 20, such as one of the many currently popular single lens reflex cameras, which has a conventional view finder 22, film advance lever 24, and a film rewind device 26. The conventional back has been replaced by the inventive "replacement" back 28. Mounted on the replacement back is a shallow housing 30 which contains the inventive film registering mechanism.

Before the replacement back 28 is installed on the camera body, four back position indexing holes (two of which are seen at 32, 34) are drilled or otherwise formed in the body at precise locations relative to a rectangular aperture 36 forming a format area through which a lens projects an image onto a film. A spring loaded, floating pressure plate 38 holds the film 40 in the plane of the format image.

In greater detail, the structure of the inventive device enclosed within housing 30 is seen in FIGS. 2-6. The camera back 28 forms a chassis which has superstructure 42 mounted on one side and a motor driven actuator 44 dependent from the other side. The superstructure 42 comprises four back positioning indexing posts 46, 48, 50, 52, each post being fixed at one of its ends in the camera back chassis 28, at the precise positions where the indexing holes are formed in the camera body. Horizontally, each of these indexing positions is slightly outside the format area and vertically they are above and below the edges of the film strip. The opposite and free ends of indexing posts 46, 48, 50, 52 terminate in back position indexing pins 54, 56, 58, 60 which fit into the back position indexing holes (e.g. 32, 34) which are formed in the camera body. Immediately beneath these indexing pins, each of the posts 46-52 has a shelf supporting bracket formed therein (as shown at 62, for example). Since the posts 46, 48, 50, 52 may have a generally round cross-section, these brackets may be formed by cutting away a flat face (e.g. 63) on the upper end of the post, to form a ledge at the bottom of the face. That ledge is the bracket which establishes the lowest point which the pressure plate 38 may reach as it slides slightly up or down the rails formed by the flat faces 63.

The pressure plate 38 has four cutouts 64, 65, 66, 68 formed therein at positions where they lay on and are supported by the shelf supporting brackets (e.g. 62) formed on the four indexing posts 46, 48, 50, 52. These cutouts guide and direct the excursion of the pressure plate 38 as it slides up or down the flat faces 63 on the indexing posts.

Figure 5:
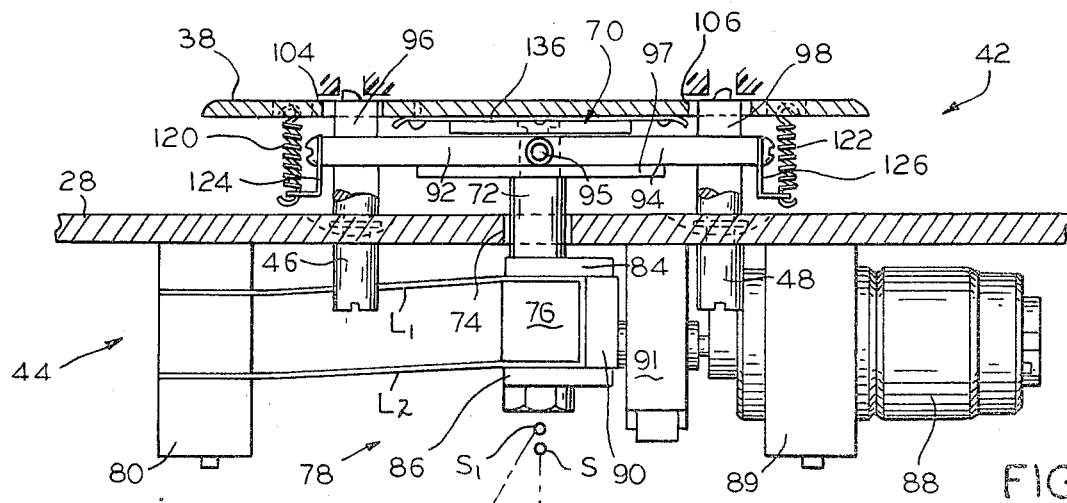
FIG. 5 is a view similar to FIG. 4 showing the film registering pins in a film engaged position (also called the "raised" position)
Figure 5:
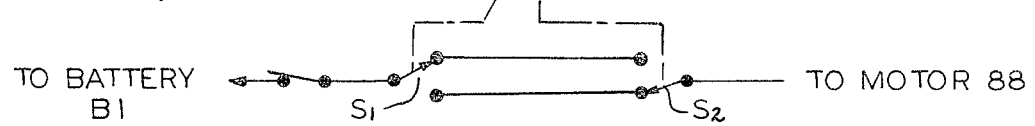

Positioned beneath the pressure plate 38 is an elevating table 70 which may be moved between a disengaged or lower position (FIG. 4) and an engaged or raised position (FIG. 5). The table 70 is supported at its center point by a post 72 which passes through a hole 74 in the chassis formed by camera back 28. (The housing back 30 (FIG. 1) and any suitable light sealing material may surround post 70 within hole 74 to provide a light shielding which protects the film). The lower end of post 72 is fixed in and supported by a block 76 mounted on the end of a cantilevered parallelogram linkage 78.

The parallelogram linkage comprises two relatively wide, cantilevered leaf springs L1, L2, held securely in a spaced parallel relationship by anchoring blocks 80 fixed to the bottom of the chassis formed by camera back 28. The opposite and free ends of the leaf springs L1, L2 are held in their spaced parallel relationship by a block 76 having cam follower means in the form of upper and lower horizontal tabs 84, 86 integrally extending outwardly therefrom.

In alignment with the leaf springs, an electrical motor 88 is securely mounted by means of a block 89 attached to the bottom of the chassis 28. Eccentrically mounted on the shaft of motor 88 and positioned between cam follower tabs 84, 86 is a wheel 90 which turns in unison with the motor shaft. (The motor shaft and eccentric wheel 90 are supported in a bearing block 91). This eccentrically mounted wheel 90 is a cam which engages the tabs 84, 86 to deflect the ends of the leaf springs L1, L2 upwardly (as in FIG. 5) or downwardly (as in FIG. 4) and thereby raise or lower post 72 and the table 70 attached thereto.

The motor is adapted, by any suitable means, to rotate through exactly 180° each time that it is energized. These means may include upper and lower limit switches S1, S2 (FIG. 5) which operate at the upper and lower extremeties of the motion. In greater detail, each of these limit switches S1, S2 comprises a light source directed onto a photocell at positions where table movement may intercept the light. Thus, the upper limit is detected when upper switch S1 is uncovered by block 76 so that the light may reach a photocell. The lower limit is detected when the lower switch S2 is covered by the block 76. The motor is powered from a suitable battery B1 (here a 9-volt battery). Hence, each time that a circuit is closed from the battery B1 to the motor 88, the post 72 moves from one to the other of its two (raised and lowered) positions, exemplified by FIGS. 4 and 5, respectively.

The table 70 comprises a pair of horizontally opposed leaves 92, 94 which are hinged together at hinge pin 95 positioned near the center line of the format area 36 to enable a small amount of vertical play. This hinge action helps to snag the sprocket holes and to hold the film taut, as explained below. Initially, the two leaves 92, 94 set at a slight dihedral angle while the table is in a lower position. As the table 70 moves into its raised position, the two leaves 92, 94 lose the dihedral angle and tend to flatten into a single plane, defined by a flat plate 97 which moves with the table 70 as is clearly seen by comparing FIGS. 4 and 5. This is the movement both holds the film taut against the surface of the pressure plate 38 and raises and lowers the pressure plate so that the film can advance without dragging.

Mounted on each of the four corners of the table 70 is a film registering pin 96, 98, 100, 102. These pins are precisely located with a pair in a spaced opposed relationship on the opposite and outside edges of each of the leaves 92, 94 of table 70. Thus, the registering pins are at the positions of four sprocket holes in the film strip which are near the corners of format area 36 (FIG. 7). Four matching and individually associated cutouts 104, 106, 108, 110 are formed in the pressure plate 38 to enable the tops of these pins 96, 98, 100, 102 to protrude through the plate when table 70 is raised or to retract beneath the plate where table 70 is lowered. Therefore, each time that the motor 88 is energized, the film registering pins 96, 98, 100, 102 either move down and below the pressure plate 38 (FIG. 4) or up and extended above the plate (FIG. 5) depending upon the position of the table before the motor is energized.

In another embodiment, the motor 88 may be replaced by a solenoid which moves the block 76, and therefore the table 70, between raised and lowered positions. In yet another embodiment the block 76 is connected through a suitable mechanical linkage to an automatic film advance mechanism. Each time that a film advance mechanism operates, the table is lowered immediately before film movement begins and is raised immediately after the film movement terminates. Accordingly, the reference herein to "motor" means is intended to generically refer to any and all suitable means for raising and lowering the table 70.

The pressure plate 38 is coupled to the table 70 by means of two coiled springs 120, 122 (FIGS. 4, 5) which hook onto dependent tabs 124, 126 anchored to the table 70. Otherwise, the pressure plate merely lies freely with its cutouts 64, 65, 66, 68 resting on the corresponding brackets (e.g. 62) formed at the bottom positions of the flat faces on indexing posts 46, 48, 50, 52.

The tops (FIG. 6) of the film registering pins 96, 98, 100, 102 terminate in a pin member with a trapizodial vertical cross-sectional shape (best seen in FIG. 6), having a vertical riser 130 on the outside (relative to the location of the format area) edge and a slanting wall 132 on the inside edge. When the table 70 is lowered to the disengaged position (FIG. 4), each register pin post tilts and leans inwardly toward the format area because coiled springs 120, 122 hold the outer edges of leaves 92, 94 in a slightly elevated position relative to the lowered center position of the post 72, thereby forming the dihedral angle. The tilt angle is marked "C" in FIG. 4. As the film stops above the pressure plate 38, a sprocket hole will always be approximately over each of the film registering pins 96, 98, 100, 102. Also, the inward movement caused by the pin tilt (angle C) insures enough play for the pin to engage a sprocket hole regardless of how the film stops with a sprocket hole in any given position relative to the pin.

When the table 70 rises (FIG. 4), the flat riser 130 (FIG. 6) of the pin engages an edge 134 of a sprocket hole. The register pin 96 post straightens to a vertical position (FIG. 5) as the leaves 92, 94 move from their dihedral angle to their planar position. Thus, the vertical riser 130 (FIG. 6) on each post tends to hook an associated sprocket hole and to draw the film taut (see FIG. 7). The film continues to be held taut until the registering posts lean to their tilted position (FIG. 4) as the table 70 lowers.

A leaf spring 136 is mounted on the back of the pressure plate 38 to bear against the table to 70 when it is necessary to urge the pressure plate upwardly in order to push the film into the focal plane in the format area. When the table 70 is lowered to the disengaged position (FIG. 4), the coiled springs 120, 122 are tensioned to cause the pressure plate 38 to move downwardly slightly so that the film will not drag over it during film advance. When the table 70 moves upwardly to the engaged position, there is a reduction of the tension of the coiled springs 120, 122. The leaf spring 136 is pushed by table 70 to, in turn, push the floating pressure plate 38 upwardly (see FIG. 5) to a raised position where the film is positively pushed into a flat focal plane in the format area. During this movement, the cut areas 64, 65, 66, 68 in pressure plate 38 slide slightly up or down on the flat faces of the indexing posts 46, 48, 50, 52 (see 63, FIG. 2).

Means are provided for positioning and repositioning an exposed image area in the format area as the film is wound and rewound for making multiple exposures. In greater detail, a sensor 138 (FIG. 6) is positioned above the film and over the row of sprocket holes, preferably on the side of the format area which is removed from the motor 88. The sensor 138 comprises a light emitting diode (LED) 140 for directing light onto the film, which is a good reflector of light in the wave length of the LED. On adjacent sides of the LED 140 are two photo cells 142, 144 which pick up light reflected from the film strip between the sprocket holes, one of which is seen at 146. These sensor components are so small that all three 140, 142, 144 read the same sprocket hole or film between the holes. When the sprocket hole is under the sensors (as shown in FIG. 6) no light is reflected fron the LED 140 onto the film and back into the photo cells. When the film moves to the left, in the direction A, an edge 148 of the film strip sprocket hole 146 first passes under photo cell 144 and thereafter under the photo cell 142. If the film moves toward the right, in the direction B, the edge 150 of the sprocket hole first passes under sensor 142 and thereafter under sensor 144. Hence, the outputs of the two sensors are two slightly out of phase pulse trains with a pulse appearing for each piece of the film strip which is between the sprocket holes. The pulse disappears when the hole appears under the sensor.

The sensor detects both the passage of each sprocket hole and the direction of film movement from the order in which the photocells 142, 144 react to the film or hole. In greater detail, as the film moves, the sensor circuit 160 is pulsed by the LED light reflected from the film strip between sprocket holes to the photo cells 142, 144. Depending upon the direction of film travel, sensor circuit 160 causes a counter 162 to count up or down (eight sprocket holes per frame) and to indicate the frame count at a digital indicator 164, which may be a conventional LED or LCD display. This way, the film may be wound, rewound and moved or returned to any desired frame. The capacity of the count depends upon the size of the film roll likely to be used in the camera. For a type of film package having a maximum of 36-exposures or a bulk film roll of 250-exposures, the counter 162 and display indicator 164 capacity would have to be at least "36" or "250", respectively.

The invention insures a completely accurate positioning of each frame, regardless of how much the film is wound or rewound. Moreover, the hinge action of the two leaves 92, 94 hold the film taut and pressure plate 38 pushes it into the focal place at the format area so that there is no misalignment caused by film buckling.

Those who are skilled in the art will readily perceive how to modify the system. Therefore, the appended claims are to be construed to cover all equivalent structures which fall within the true scope and spirit of the invention.

The claimed invention is:

1. A device for positioning a film strip having a row of sprocket holes extending along each of its two opposite sides, said device comprising a chassis having a plurality of back position indexing means for cooperating with indexing means formed on a camera body to insure precise alignment with respect to a rectangular format area of said camera body by said chassis table means supported by said chassis for movement between film engaged and disengaged positions, means on said tables for snagging four of said sprocket holes near the four corners of said rectangular format area and motor device means for pulling said film taut and pressing said taut film into the focal plane of said camera.

2. The device of claim 1 wherein said table comprises two leaves which are hinged together near a center line of the format area, said snagging means comprises two upstanding posts on each of said leaves with the posts on one leaf in a spaced opposed relationship to the posts on the other leaf, and said table is supported for said movement near the pivot line of said hinges, resilient means for holding the outside edges of said leaves in an elevated position, whereby said table moves between a planar position and a position having a dihedral angle, said upstanding posts tilting and straightening as said table moves between said angular and said planar positions in order to snag and taut said film.

3. The device of claim 2 wherein a floating pressure plate is positioned above said table and biased toward said film to press said film into a focal plane, said resilient means being coupled between said pressure plate and said leaves to pull said pressure plate away from said focal plane when said table is in a disengaged position.

4. The device of claim 2 wherein the top of said snagging means comprises a pin having a somewhat trapezoidal vertical cross-section with a vertical riser on the outside edge relative to said format area and a slanting side on the inside edge relative to said format area.

5. The device of any of the claims 1-4 wherein said motor device means is associated with said chassis for imparting said movement to said table.

6. The device of any of the claims 1-4 and cantilevered parallelogram linkage means controlled by said motor device means for moving said table in a linear movement between said engaged and disengaged positions.

7. The device of claim 6 and limit switch means for detecting when said table is in said engaged and said disengaged positions, and means responsive to said limit switch means for controlling said motor device means.

8. The device of claim 7 wherein said parallelogram linkage means has cam follower means associated therewith and said motor device means has a rotary shaft with a cam for controlling said cam follower means, said limit switch means detecting the cam positions which place said follower means and said parallelogram linkage means in either its uppermost or its lower most positions, and means responsive to said limit switch means for driving said motor device means to move said cam from its existing position to the other of said engaged and disengaged positions.

9. The device of any one of the claims 1-4 and sensor means positioned over at least one row of said sprocket holes for detecting each sprocket hole and the direction of film movement, counter means driven by said sensory means for identifying the frame of the film which is in the format area.

10. A method of film position control in a photographic apparatus comprising the steps of:
(a) moving film having opposed rows of sprocket holes adjacent edges of said film,
(b) stopping said moving film over a generally rectangular format area,
(c) snagging said sprocket holes near the corners of said format areas and pulling said film taut, and
(d) pressing said film into a focal plane in said photographic apparatus.

11. The method of claim 10 and the added steps of:
(e) counting said sprocket holes, and
(f) indicating the frame in said format area responsive to the counting of step (e).

* * * * *